(12) United States Patent
Mizutani

(10) Patent No.: US 7,500,139 B2
(45) Date of Patent: Mar. 3, 2009

(54) SECURING TIME FOR IDENTIFYING CAUSE OF ASYNCHRONISM IN FAULT-TOLERANT COMPUTER

(75) Inventor: Fumitoshi Mizutani, Tokyo (JP)

(73) Assignee: NEC Corporation, Tokyo (JP)

( * ) Notice: Subject to any disclaimer, the term of this patent is extended or adjusted under 35 U.S.C. 154(b) by 464 days.

(21) Appl. No.: 11/311,607

(22) Filed: Dec. 19, 2005

(65) Prior Publication Data

US 2006/0150006 A1     Jul. 6, 2006

(30) Foreign Application Priority Data

Dec. 21, 2004   (JP)   ............................. 2004-369545

(51) Int. Cl.
*G06F 11/00*     (2006.01)
(52) U.S. Cl. .............................. 714/12; 714/10; 714/11
(58) Field of Classification Search .................. 714/12, 714/10, 11
See application file for complete search history.

(56) References Cited

U.S. PATENT DOCUMENTS

| | | | | | |
|---|---|---|---|---|---|
| 4,541,094 | A | * | 9/1985 | Stiffler et al. .................. | 714/53 |
| 4,757,442 | A | * | 7/1988 | Sakata ........................... | 714/11 |
| 4,979,108 | A | * | 12/1990 | Crabbe, Jr. ................... | 718/106 |
| 5,099,485 | A | * | 3/1992 | Bruckert et al. ............... | 714/11 |
| 5,204,952 | A | * | 4/1993 | Ayers et al. ................... | 714/48 |
| 5,226,152 | A | * | 7/1993 | Klug et al. ..................... | 714/12 |
| 5,301,309 | A | * | 4/1994 | Sugano ......................... | 714/12 |
| 5,339,408 | A | * | 8/1994 | Bruckert et al. ............... | 714/11 |
| 5,398,331 | A | * | 3/1995 | Huang et al. ................... | 714/12 |
| 5,452,443 | A | * | 9/1995 | Oyamada et al. ............... | 714/10 |
| 5,615,327 | A | * | 3/1997 | Magee et al. .................. | 714/12 |
| 5,615,403 | A | * | 3/1997 | Bissett et al. .................. | 710/61 |
| 5,687,310 | A | * | 11/1997 | Rotker et al. ................... | 714/11 |
| 5,737,513 | A | * | 4/1998 | Matsuda et al. ............... | 714/11 |
| 5,751,955 | A | * | 5/1998 | Sonnier et al. ................ | 714/12 |
| 5,778,206 | A | * | 7/1998 | Pain et al. ..................... | 710/305 |
| 5,790,776 | A | * | 8/1998 | Sonnier et al. ................ | 714/10 |
| 5,838,894 | A | * | 11/1998 | Horst ........................... | 714/11 |
| 5,953,742 | A | | 9/1999 | Williams | |
| 5,974,491 | A | * | 10/1999 | Jung et al. ................... | 710/106 |

(Continued)

FOREIGN PATENT DOCUMENTS

EP        0 757 315 A2      2/1997

(Continued)

*Primary Examiner*—Robert Beausoliel
*Assistant Examiner*—Joshua P Lottich
(74) *Attorney, Agent, or Firm*—Scully, Scott, Murphy & Presser PC

(57) ABSTRACT

A fault-tolerant computer has a pair of duplex systems having respective CPU subsystems that are operable identically in lock-step synchronism. Each of the duplex systems has a CPU, a main storage unit, a CPU bus controller, and a DMA controller. The CPU and the main storage unit are included in each of the CPU subsystems. The CPU bus controller continuously operates the CPU of its own system even if it detects an asynchronous operation while the CPU subsystems are operating in synchronism with each other. Even if the asynchronous operation is detected, the DMA controller holds a DMA transfer process for transferring data stored in the main storage unit of its own system or the other system to the main storage unit of the other system or its own system after the asynchronous operation is detected until a certain time is reached.

8 Claims, 9 Drawing Sheets

U.S. PATENT DOCUMENTS

| | | | |
|---|---|---|---|
| 6,101,627 A * | 8/2000 | Shimomura et al. | 714/820 |
| 6,233,702 B1 | 5/2001 | Horst et al. | |
| 6,260,159 B1 * | 7/2001 | Garnett et al. | 714/15 |
| 6,327,670 B1 * | 12/2001 | Hellenthal et al. | 714/5 |
| 6,393,582 B1 * | 5/2002 | Klecka et al. | 714/11 |
| 6,496,940 B1 * | 12/2002 | Horst et al. | 714/4 |
| 6,625,749 B1 * | 9/2003 | Quach | 714/10 |
| 6,643,796 B1 * | 11/2003 | Floyd et al. | 714/10 |
| 6,687,851 B1 * | 2/2004 | Somers et al. | 714/12 |
| 6,694,449 B2 * | 2/2004 | Ghameshlu et al. | 714/11 |
| 6,925,512 B2 * | 8/2005 | Louzoun et al. | 710/100 |
| 6,948,091 B2 * | 9/2005 | Bartels et al. | 714/11 |
| 6,961,826 B2 * | 11/2005 | Garnett et al. | 711/144 |
| 7,017,073 B2 * | 3/2006 | Nair et al. | 714/11 |
| 7,055,060 B2 * | 5/2006 | Nguyen et al. | 714/11 |
| 7,111,196 B2 * | 9/2006 | Balazich et al. | 714/13 |
| 7,124,319 B2 * | 10/2006 | Watkins et al. | 714/12 |
| 7,155,721 B2 * | 12/2006 | Safford et al. | 718/104 |
| 7,237,144 B2 * | 6/2007 | Safford et al. | 714/11 |
| 7,290,169 B2 * | 10/2007 | Safford et al. | 714/11 |
| 7,296,181 B2 * | 11/2007 | Safford et al. | 714/11 |
| 7,313,641 B2 * | 12/2007 | Koch et al. | 710/308 |
| 7,430,687 B2 * | 9/2008 | Takada | 714/11 |
| 2002/0065987 A1 | 5/2002 | Garnett et al. | |
| 2002/0065996 A1 * | 5/2002 | Garnett et al. | 711/156 |
| 2003/0182594 A1 * | 9/2003 | Watkins et al. | 714/11 |
| 2004/0010789 A1 * | 1/2004 | Yamazaki et al. | 718/102 |
| 2004/0153750 A1 * | 8/2004 | Aino et al. | 714/11 |
| 2004/0153756 A1 * | 8/2004 | Tsukahara | 714/13 |
| 2004/0153857 A1 * | 8/2004 | Yamazaki et al. | 714/43 |
| 2005/0229035 A1 * | 10/2005 | Peleska et al. | 714/12 |
| 2006/0007871 A1 * | 1/2006 | Welin | 370/252 |
| 2006/0020852 A1 * | 1/2006 | Bernick et al. | 714/11 |

FOREIGN PATENT DOCUMENTS

| | | |
|---|---|---|
| EP | 0 757 315 A3 | 2/1997 |
| EP | 0 817 053 A1 | 1/1998 |
| EP | 1 380 950 A1 | 1/2004 |
| JP | 8-190494 | 7/1996 |
| JP | 10-116258 | 5/1998 |
| JP | 1998-177498 | 6/1998 |
| JP | 2879480 | 1/1999 |
| JP | 2004-46455 | 2/2004 |
| JP | 2004-110803 | 4/2004 |

* cited by examiner

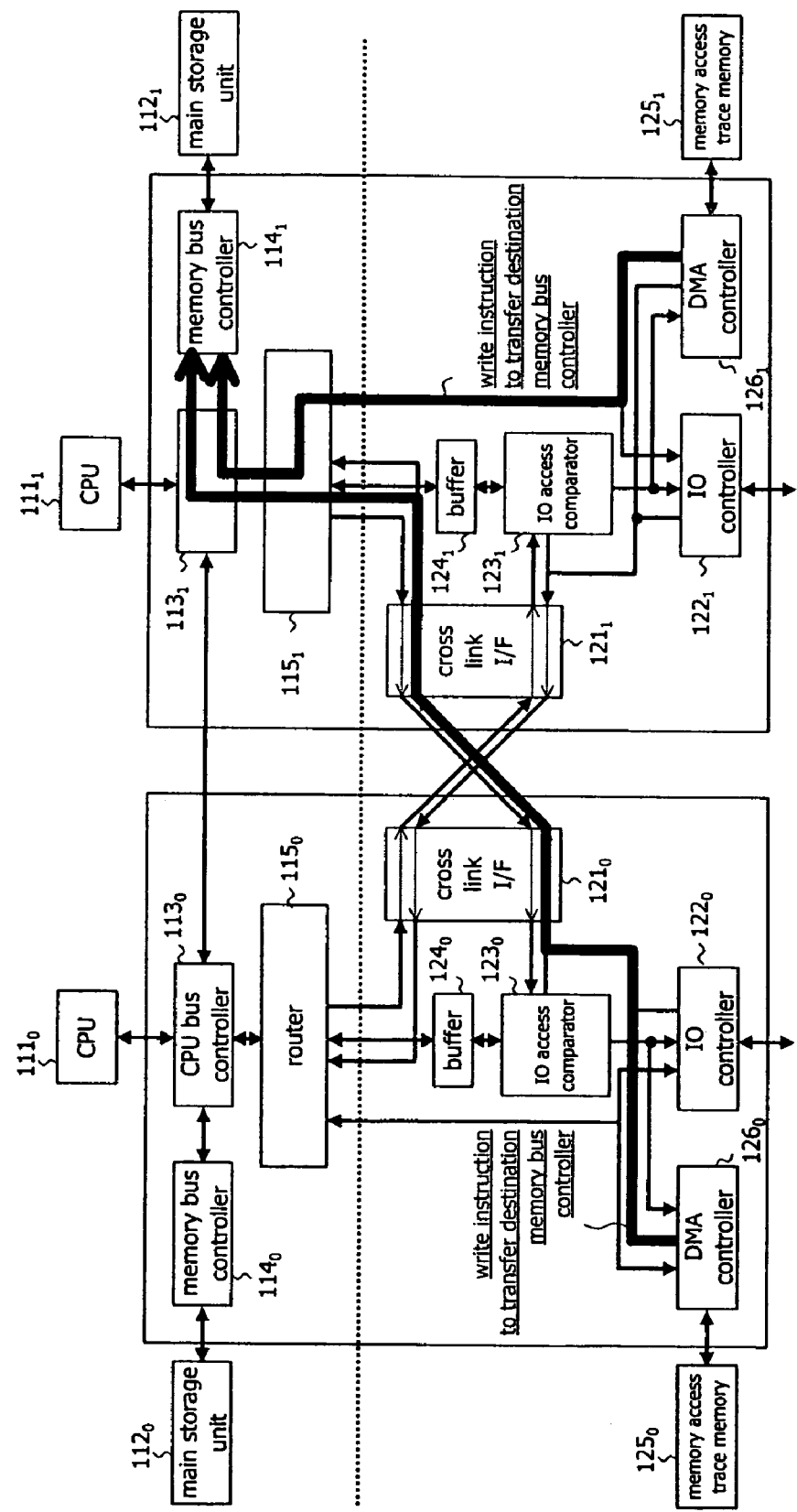

SECURING TIME FOR IDENTIFYING CAUSE OF ASYNCHRONISM IN FAULT-TOLERANT COMPUTER

BACKGROUND OF THE INVENTION

1. Field of the Invention

The present invention relates to a fault-tolerant computer with DMR (Double Modular Redundancy) systems each including a CPU subsystem having a CPU and a main storage unit and an IO subsystem, and a method of controlling such a fault-tolerant computer.

2. Description of the Related Art

In recent years, growing computer functionality has enabled computers to be used in a wider variety of fields. Such computers are required to operate continuously even in the event of faults. One solution to meet the requirement is fault-tolerant technology with duplex systems.

A fault-tolerant computer built on the fault-tolerant technology has duplex systems each including a CPU subsystem having a CPU and a main storage unit and an IO subsystem. Some fault-tolerant computers employ a lock-step system for operating the two CPU subsystems synchronously with each other based on synchronous clocks.

In fault-tolerant computers with a lock-step system, the two CPU subsystems may operate out of synchronism, tending to bring the data stored in the main storage units thereof out of conformity with each other. Causes of the asynchronism are of relatively minor nature, including a CPU failure, a software error caused by a radiation to change the data stored in the main storage units, and an operational event that is not guaranteed by the lock-step system.

When a fault-tolerant computer with a lock-step system suffers an asynchronous operation, a resynchronizing process is performed to synchronize the two CPU subsystems with each other. The resynchronizing process is divided into several phases. One of the phases copies the data stored in the main storage unit of one of the CPU subsystems to the main storage unit of the other CPU subsystem, thereby bringing the data in the main storage units into conformity with each other.

A conventional fault-tolerant computer that is designed to speed up the above resynchronizing process is disclosed in JP-A-1998-177498 (hereinafter referred to as "Document 1"), for example.

In the fault-tolerant computer disclosed in Document 1, when a write event occurs to write data to one of the main storage units while the CPU subsystems are operating in synchronism with each other, each of the CPU subsystems records information representing the position (page) of the main storage unit where the recorded data is updated by the write event and the time when the recorded data is updated by the write event. In the event of an asynchronous operation, based on the recorded information, only the updated data of the data stored in the main storage unit of one of the CPU subsystems is copied to the main storage unit of the other CPU subsystem.

In the fault-tolerant computer disclosed in Document 1, since only the updated data, but not all the data stored in the main storage unit, is copied, the time required to copy the data is shortened, and hence the resynchronizing process is shortened.

However, when an asynchronous operation of the fault-tolerant computer disclosed in Document 1 is detected, the cause of the asynchronous operation is not detected, but the resynchronizing process is immediately carried out to copy the updated data of the data stored in the main storage unit of one of the CPU subsystems to the main storage unit of the other CPU subsystem.

Consequently, if the asynchronous operation is caused by a failure of the CPU of the CPU subsystem from which the updated data is to be copied, then the fault-tolerant computer will not be guaranteed for its operation even after the resynchronizing process is fully completed.

Accordingly, when an asynchronous operation of a fault-tolerant computer, is detected, it is necessary to identify the cause of the asynchronous operation and then to start the resynchronizing process.

If a long period of time is consumed to identify the cause of an asynchronous operation, however, because the CPU subsystems keep operating out of synchronism during that period of time, the nonconformity of the data stored in the main storage units of the CPU subsystems grows, making it difficult to shorten the resynchronizing process that is to be performed subsequently.

Therefore, if the cause of an asynchronous operation is to be identified prior to the start of the resynchronizing process, then it is necessary to minimize the nonconformity of the data stored in the main storage units of the CPU subsystems.

SUMMARY OF THE INVENTION

It is an object of the present invention to provide a fault-tolerant computer which is capable of identifying the cause of an asynchronous operation which is detected, prior to the start of a resynchronizing process, and a method of controlling a fault-tolerant computer.

Another object of the present invention is to provide a fault-tolerant computer which is capable of minimizing the nonconformity of data stored in main storage units of CPU subsystems of the fault-tolerant computer, which nonconformity is caused by identifying the cause of an asynchronous operation prior to the start of a resynchronizing process, and a method of controlling a fault-tolerant computer.

A fault-tolerant computer according to the present invention has a pair of duplex systems having respective CPU subsystems operable identically in lock-step synchronism. Each of the duplex systems comprises a CPU, a main storage unit, a CPU bus controller, a trace memory, and a DMA controller.

The CPU and the main storage unit are included in each of the CPU subsystems.

The CPU bus controller continuously operates the CPU of its own system without shutdown if an asynchronous operation is detected while the CPU subsystems are operating in synchronism with each other.

The trace memory stores information as to a writing area for storing data in the main storage unit of its own system each time data is stored in the main storage unit of its own system after the asynchronous operation is detected by the CPU bus controller.

If the asynchronous operation is detected by the CPU bus controller, the DMA controller holds a DMA transfer process to transfer the data, whose writing area is stored in the trace memory, stored in the main storage unit of its own system or the other system, to the main storage unit of the other system or its own system, after the asynchronous operation is detected until a predetermined time is reached.

With the above arrangement, when an asynchronous operation is detected, it is possible to secure a period of time required to identify the cause of the asynchronous operation on a software or hardware basis before the DMA transfer process as a resynchronizing process is started.

The fault-tolerant computer may further be arranged as follows: Each of the duplex systems may further comprise a buffer and an access comparator. The buffer may temporarily store input data and thereafter outputs the data. The access comparator may send an interrupt signal to the CPU if details of an access from the CPU of its own system through the buffer and details of an access from the CPU of the other system are compared with each other and detected as being not in conformity with each other and also if the storage capacity of the buffer which has been used exceeds a predetermined value. The predetermined time to be reached in the DMA controller may be a time when the interrupt signal is sent from the access comparator to the CPU.

The DMA controller may send an interrupt signal to the CPU if the storage capacity of the trace memory which has been used exceeds a predetermined value. The predetermined time to be reached in the DMA controller may be a time when the interrupt signal is sent from the DMA controller to the CPU.

With the above arrangement, the predetermined time to be reached in the DMA controller is a time when the interrupt signal is sent from the DMA controller or the access comparator to the CPU. The interrupt signal may substitute for a signal for indicating to the CPU that the data stored in the main storage unit after the time when the interrupt signal is sent cannot be transferred by the DMA controller according to the DMA transfer process. As the period of time required to identify the cause of an asynchronous operation may be limited to a minimum period of time required to perform the DMA transfer process, the period of time required to identify the cause of the asynchronous operation can be secured, and the nonconformity of the data stored in the main storage units, which is caused by securing the period of time required to identify the cause of the asynchronous operation, may be held to a minimum, thereby shortening the resynchronizing process.

The fault-tolerant computer may further be arranged as follows: The CPU bus controller may detect the asynchronous operation by monitoring an operating state of a CPU bus of its own system, sending CPU bus operational information representative of the monitored operating state to the CPU bus controller of the other system, and comparing the CPU bus operational information of its own system and the CPU bus operational information of the other system with each other.

With the above arrangement, the CPU bus controllers may directly compare operations of the CPU buses with each other to detect an asynchronous operation early before the nonconformity of data stored in the main storage units grows, thereby shortening the resynchronizing process.

The above and other objects, features, and advantages of the present invention will become apparent from the following description with reference to the accompanying drawings which illustrate examples of the present invention.

BRIEF DESCRIPTION OF THE DRAWINGS

FIG. 9 is a block diagram illustrative of processing details of step 208 of the flowchart shown in FIG. 2.

DESCRIPTION OF THE PREFERRED EMBODIMENT

Figure 1:
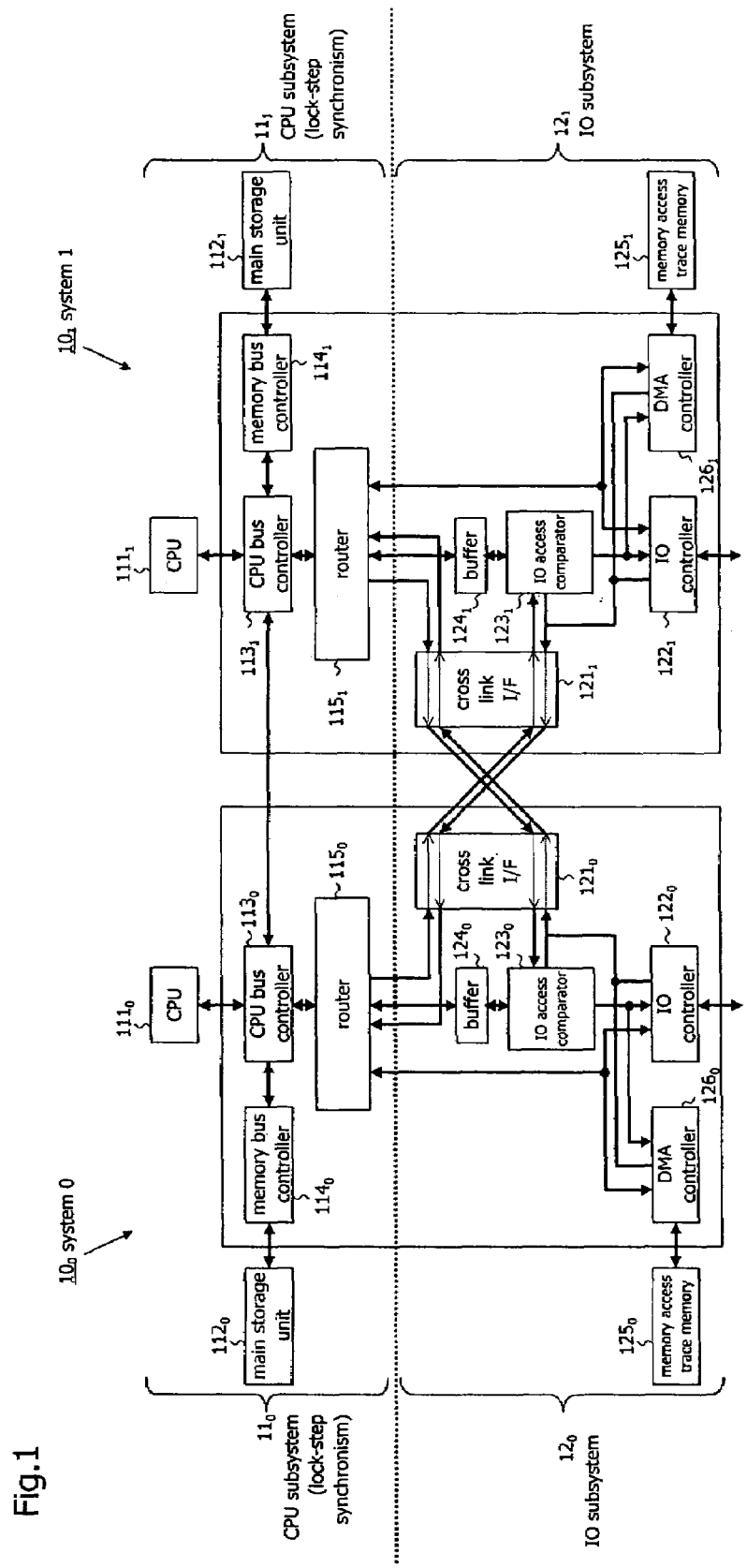
FIG. 1 is a block diagram of a fault-tolerant computer according to an embodiment of the present invention.

As shown in FIG. 1, a fault-tolerant computer according to an embodiment of the present invention has a pair of duplex systems, i.e., system $10_0$ (system 0) comprising CPU subsystem $11_0$ and IO subsystem $12_0$ and system $10_1$ (system 1) comprising CPU subsystem $11_1$ and IO subsystem $12_1$. CPU subsystem $11_0$ and CPU subsystem $11_1$ operate synchronously with each other according to lock-step synchronism (hereinafter referred to simply as "synchronism").

CPU subsystem $11_0$ comprises CPU $111_0$, main storage unit $112_0$, CPU bus controller $113_0$, memory bus controller $114_0$, and router $115_0$. IO subsystem $12_0$ comprises cross link I/F $121_0$, IO controller $122_0$, IO access comparator $123_0$, buffer $124_0$, memory access trace memory $125_0$, and DMA (Direct Memory Access) controller $126_0$.

Similarly, CPU subsystem $11_1$ comprises CPU $111_1$, main storage unit $112_1$, CPU bus controller $113_1$, memory bus controller $114_1$, and router $115_1$. IO subsystem $12_1$ comprises cross link I/F $121_1$, IO controller $122_1$, IO access comparator $123_1$, buffer $124_1$, memory access trace memory $125_1$, and DMA (Direct Memory Access) controller $126_1$.

Operation of the components of systems $10_0$, $10_1$ will be described below. Though only operation of the components of system $10_0$ will be described in detail below, the components of system $10_1$ will operate similarly to the components of system $10_0$.

CPU bus controller $113_0$ monitors a CPU bus between itself and CPU $111_0$ of its own system for operation, and sends CPU bus operational information representative of the monitored result to CPU bus controller $113_1$ of the other system. CPU bus controller $113_0$ also compares the CPU bus operational information of its own system with the CPU bus operational information of the other system, and detects when they do not agree with each other, i.e., when systems $10_0$, $10_1$ operate out of synchronism with each other. If CPU bus controller $113_0$ detects a CPU bus nonconformity, then CPU bus controller $113_0$ sends a signal indicative of the CPU bus nonconformity through router $115_0$ to DMA controller $126_0$. CPU bus controller $113_0$ sends CPU bus operational information including a CPU bus inactive state at all times. As the CPU bus itself has a large bandwidth, the amount of CPU bus operational information is reduced by being subjected to CRC (Cyclic Redundancy Check) code conversion by CPU bus controller $113_0$.

CPU bus controller $113_0$ specifies an address/page of main storage unit $112_0$ and sends a write instruction for main storage unit $112_0$ to memory bus controller $114_0$. The write instruction is also sent to DMA controller $126_0$. When instructed by DMA controller $126_0$, CPU bus controller $113_0$ also specifies an address/page of main storage unit $112_0$ and sends a read instruction for main storage unit $112_0$ to memory bus controller $114_0$.

In response to a write instruction or a read instruction from CPU bus controller $113_0$, memory bus controller $114_0$ writes data in the corresponding address/page of main storage unit $112_0$ or reads data from the corresponding address/page of main storage unit $112_0$.

Router $115_0$ is located at the boundary between CPU subsystem $11_0$ and IO subsystem $12_0$, and relays data between CPU subsystem $11_0$ and IO subsystem $12_0$.

Cross link I/F $121_0$ is a high-speed interface for communications between IO subsystem $12_0$ and IO subsystem $12_1$. Cross link I/F $121_0$ generally comprises a serial link that operates out of synchronism with the internal clock of system $10_0$.

IO controller $122_0$ receives accesses from both CPU $111_0$ of its own system and CPU $111_1$ of the other system. These two accesses are identical to each other when CPU subsystem $11_0$ and CPU subsystem $11_0$, operate in synchronism with each other. IO controller $122_0$ accesses both CPU $111_0$ of its own system and CPU $111_1$ of the other system.

IO access comparator $123_0$ compares details of an access from CPU $111_0$ of its own system to IO controller $122_0$ of its own system with details of an access from CPU $111_1$ of the other system to IO controller $122_0$ of its own system. If the compared access details are not in conformity with each other, then IO access comparator $123_0$ sends a signal indicative of the nonconformity through router $115_0$ to CPU $111_0$ by way of an interrupt. At this time, since the access from CPU $111_0$ of its own system comes via an internal path only and the access from CPU $111_1$ of the other system comes via an external path, the arrival time of the access from CPU $111_1$ of the other system is delayed. To avoid the difference between the arrival times of the accesses, buffer $124_0$ located in an input stage of IO access comparator $123_0$ temporarily stores the data of the access from CPU $111_0$ of its own system, and then outputs the access to IO access comparator $123_0$. In this manner, shuffling in the order of the access data can be adjusted, and IO access comparator $123_0$ can wait without determining an access nonconformity until the accesses from both systems arrive at IO access comparator $123_0$.

If IO access comparator $123_0$ detects when the storage capacity of buffer $124_0$ that has been used to store data exceeds a predetermined value, then IO access comparator $123_0$ sends a signal indicating that the storage capacity exceeds the predetermined value through router $115_0$ to CPU $111_0$ by way of an interrupt.

Based on a write instruction sent from CPU bus controller $113_0$ to main storage unit $112_0$, DMA controller $126_0$ stores address/page information of main storage unit $112_0$ where data is written, into memory access trace memory $125_0$ according to the FIFO (First-In First-Out) process. DMA controller $126_0$ starts storing address/page information after it is supplied with a signal indicative of a CPU bus nonconformity from CPU bus controller $113_0$. Data may be written in main storage unit $112_0$ by an instruction sent from DMA controller $126_0$ to CPU bus controller $113_0$. In this case, DMA controller $126_0$ does not trace main storage unit $112_0$. For this purpose, CPU bus controller $113_0$ should desirably apply a certain mark to a write instruction that it sends to main storage unit $112_0$.

If DMA controller $126_0$ detects when the storage capacity of memory access trace memory $125_0$ that has been used to store data exceeds a predetermined value, then DMA controller $126_0$ sends a signal indicating that the storage capacity exceeds the predetermined value through router $115_0$ to CPU $111_0$ of its own system and also through cross link I/F $121_0$ to CPU $111_1$ of the other system by way of an interrupt.

DMA controller $126_0$ further transfers the data of a corresponding address/page of main storage unit $112_0$ depending on the address/page information stored in memory access trace memory $125_0$ to both main storage unit $112_0$ of its own system and main storage unit $112_0$ of the other system according to the DMA transfer process. DMA controller $126_0$ starts to transfer the data of the corresponding address/page in response to a software instruction.

Now, operation of the fault-tolerant computer according to the embodiment shown in FIG. 1 will be described below. The operation to be described below of the fault-tolerant computer is based on the premise that CPU subsystem $11_0$, $11_1$ operate in synchronism with each other when the fault-tolerant computer starts to operate.

Figure 2:
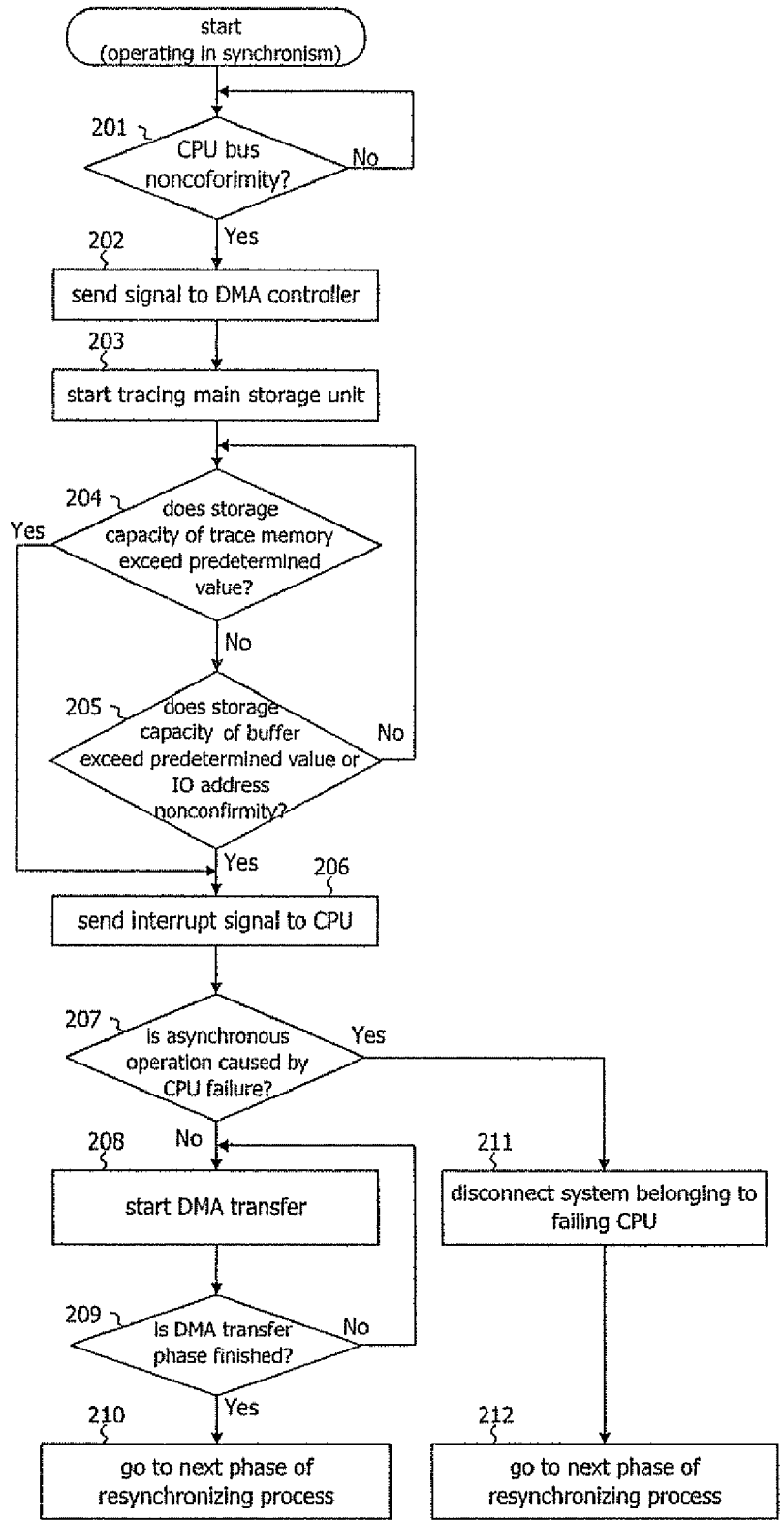
FIG. 2 is a flowchart of an operation sequence of the fault-tolerant computer shown in FIG. 1.
Figure 3:
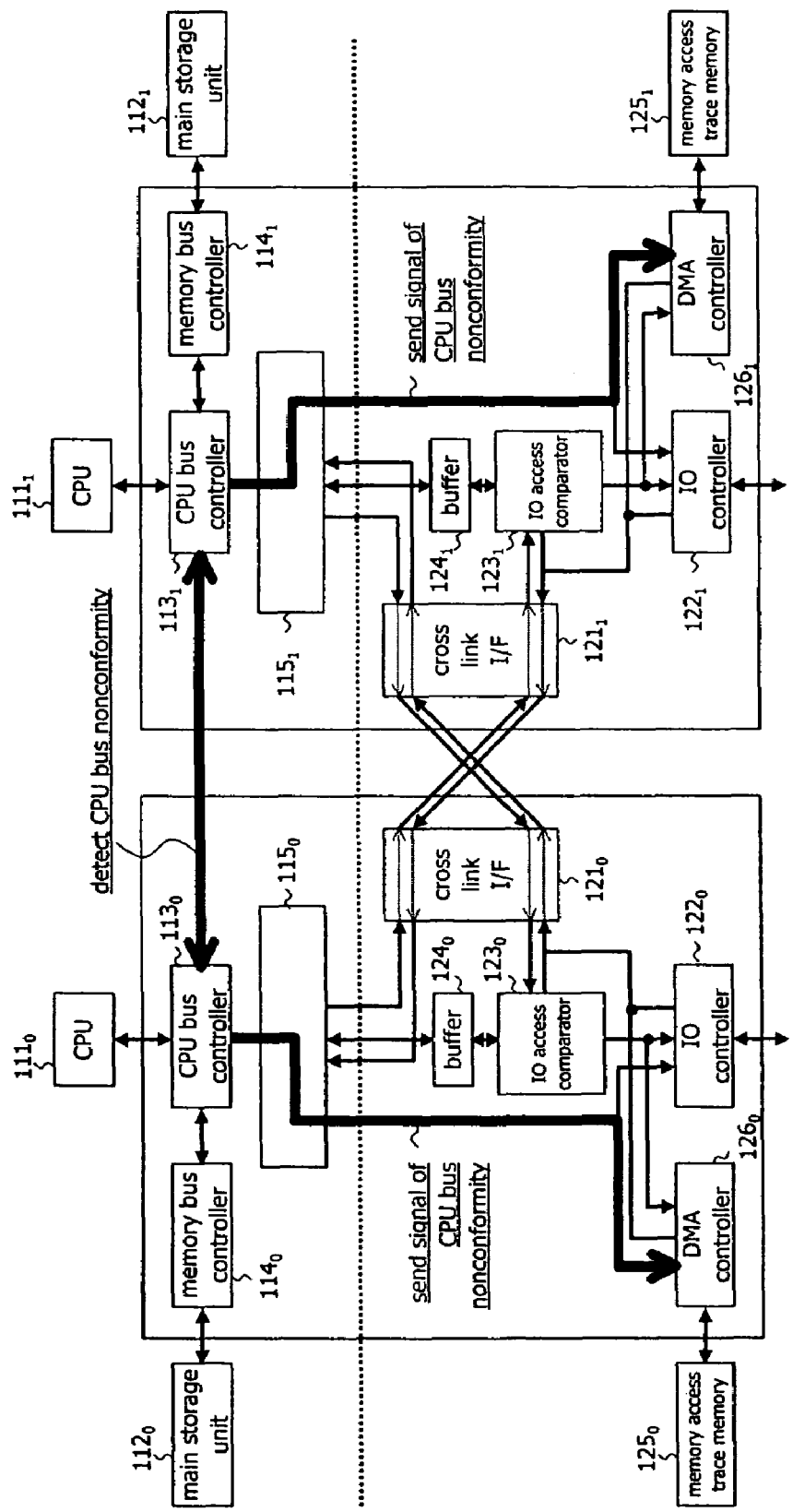
FIG. 3 is a block diagram illustrative of processing details of steps 201, 202 of the flowchart shown in FIG. 2.

As shown in FIG. 2, while CPU subsystem $11_0$, $11_1$ are operating in synchronism with each other, it is assumed that CPU bus controllers $113_0$, $113_1$ detect an asynchronous operation due to a CPU bus nonconformity in step $201$. In step $202$, CPU bus controller $113_0$ sends a signal representative of the CPU bus nonconformity to DMA controller $126_0$, and CPU bus controller $113_1$ sends a signal representative of the CPU bus nonconformity to DMA controller $126_1$, as shown in FIG. 3.

CPU bus controllers $113_0$, $113_1$ also send the signals representative of the CPU bus nonconformity to software and hardware entities (not shown) for diagnosing whether the asynchronous operation is caused by a CPU failure or not.

Even in the event of the asynchronous operation, however, CPU bus controller $113_0$ continuously operates CPU $111_0$ without shutdown and CPU bus controller $113_1$ continuously operates CPU $111_1$ without shutdown.

Continued operation of CPUs $111_0$, $111_1$ even after the occurrence of the asynchronous operation makes it more possible to determine whether the asynchronous operation is caused by a CPU failure or not based on a software and hardware diagnostic process.

When DMA controller $126_0$ receives the signal representative of the CPU bus nonconformity from CPU bus controller $113_0$, DMA controller $126_0$ starts tracing main storage unit $112_0$ in step $203$. When DMA controller $126_1$ receives the signal representative of the CPU bus nonconformity from CPU bus controller $113_1$, DMA controller $126_1$ also starts tracing main storage unit $112_1$ in step $203$.

Figure 4:
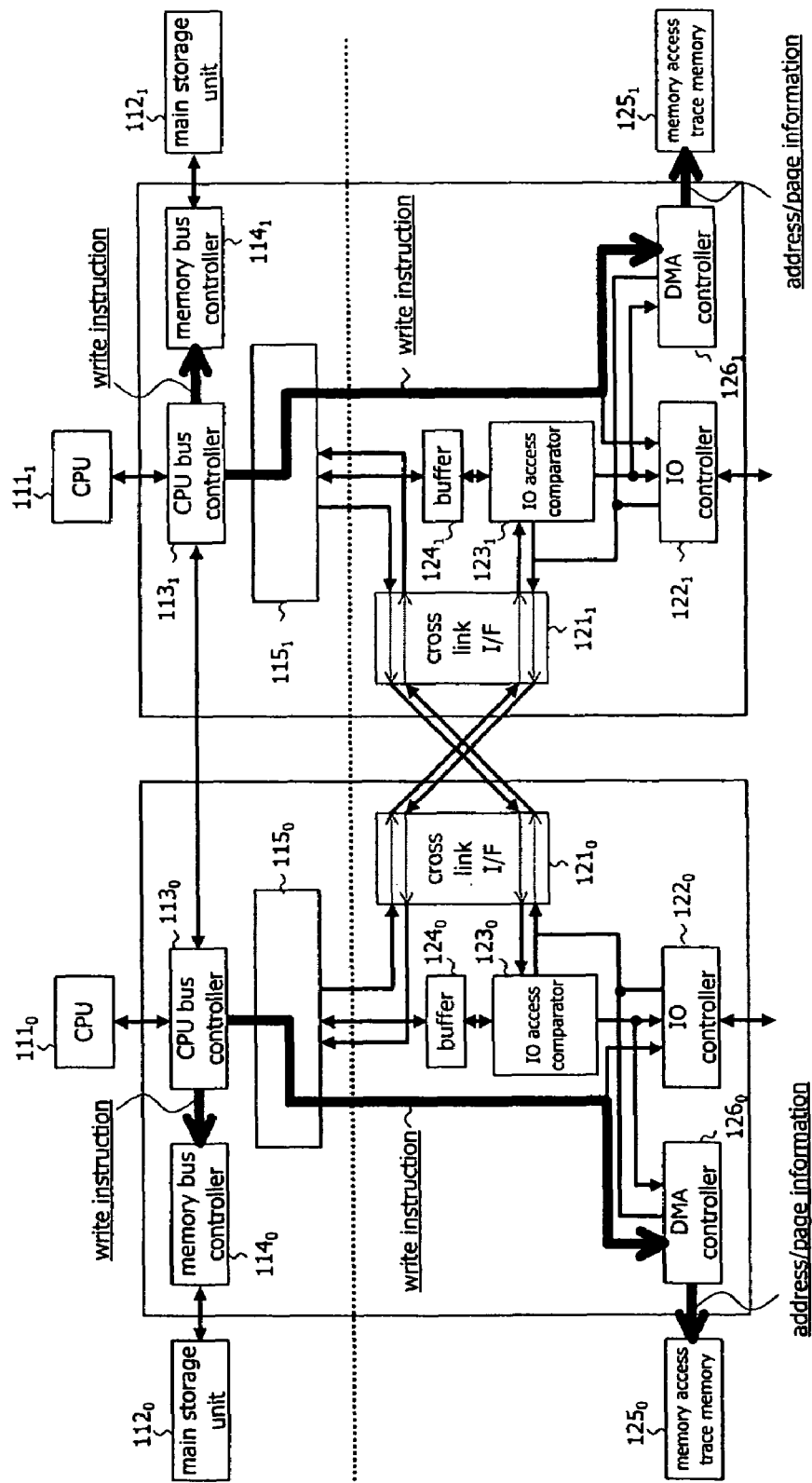
FIG. 4 is a block diagram illustrative of processing details of step 203 of the flowchart shown in FIG. 2.

Specifically, based on a write instruction sent from CPU bus controller $113_0$ to main storage unit $112_0$, DMA controller $126_0$ stores address/page information of main storage unit $112_0$ where data is written, into memory access trace memory $125_0$. Based on a write instruction sent from CPU bus controller $113_1$ to main storage unit $112_1$, DMA controller $126_1$ stores address/page information of main storage unit $112_1$ where data is written, into memory access trace memory $125_1$. The storage of the address/page information is illustrated in FIG. 4.

Figure 5:
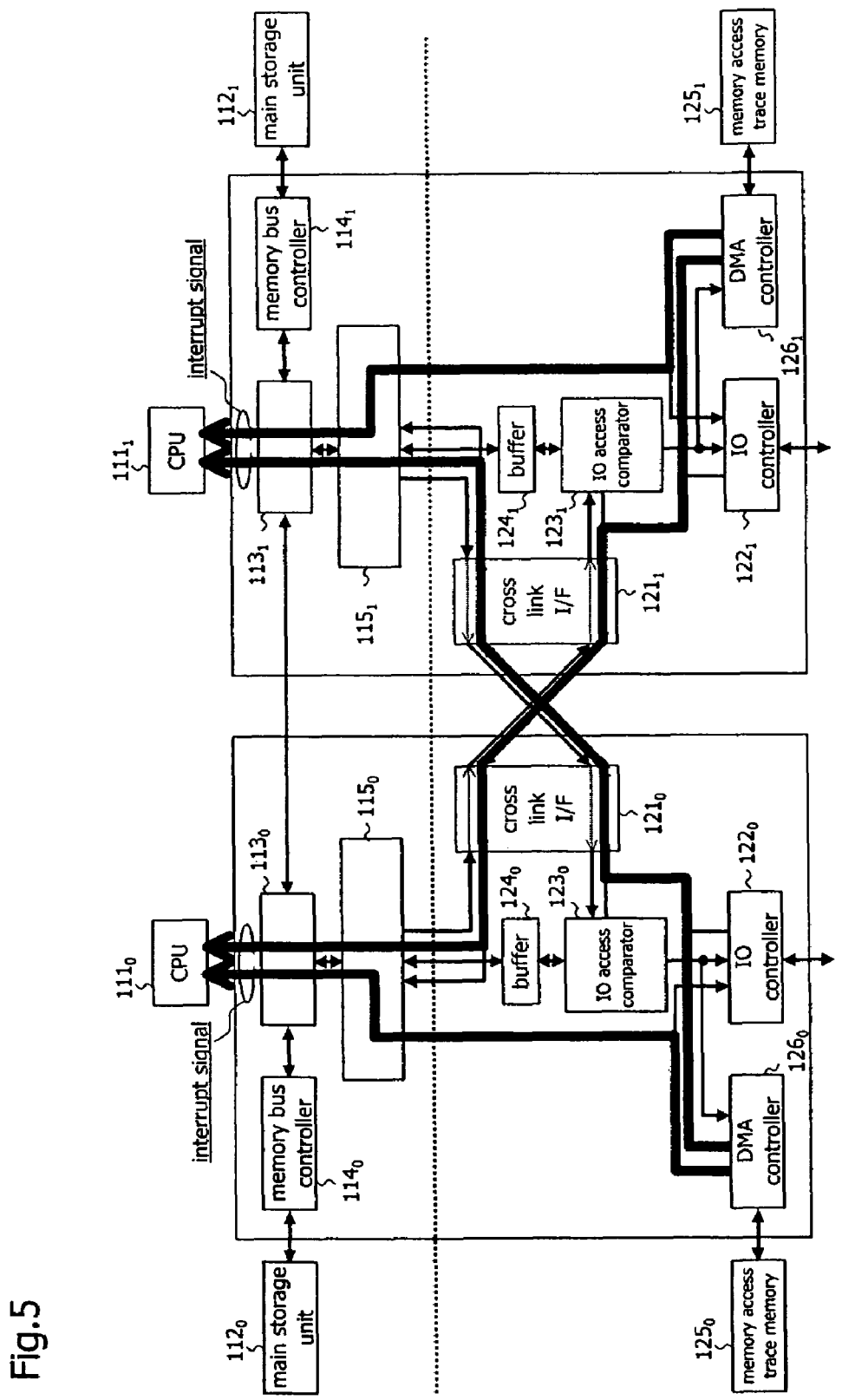
FIG. 5 is a block diagram illustrative of processing details of steps 204, 206 of the flowchart shown in FIG. 2.

Thereafter, in step $204$, it is assumed that DMA controller $126_0$ detects when the storage capacity of memory access trace memory $125_0$ that has been used to store data exceeds a predetermined value and DMA controller $126_1$ detects when the storage capacity of memory access trace memory $125_1$ that has been used to store data exceeds a predetermined value. In step $206$, DMA controller $126_0$ sends a signal indicating that the storage capacity exceeds the predetermined value to CPU $111_0$ of its own system and CPU $111_1$ of the other system by way of an interrupt, and DMA controller $126_1$ sends a signal indicating that the storage capacity exceeds the predetermined value to CPU $111_1$ of its own system and CPU $111_0$ of the other system by way of an interrupt, as shown in FIG. 5.

Figure 6:
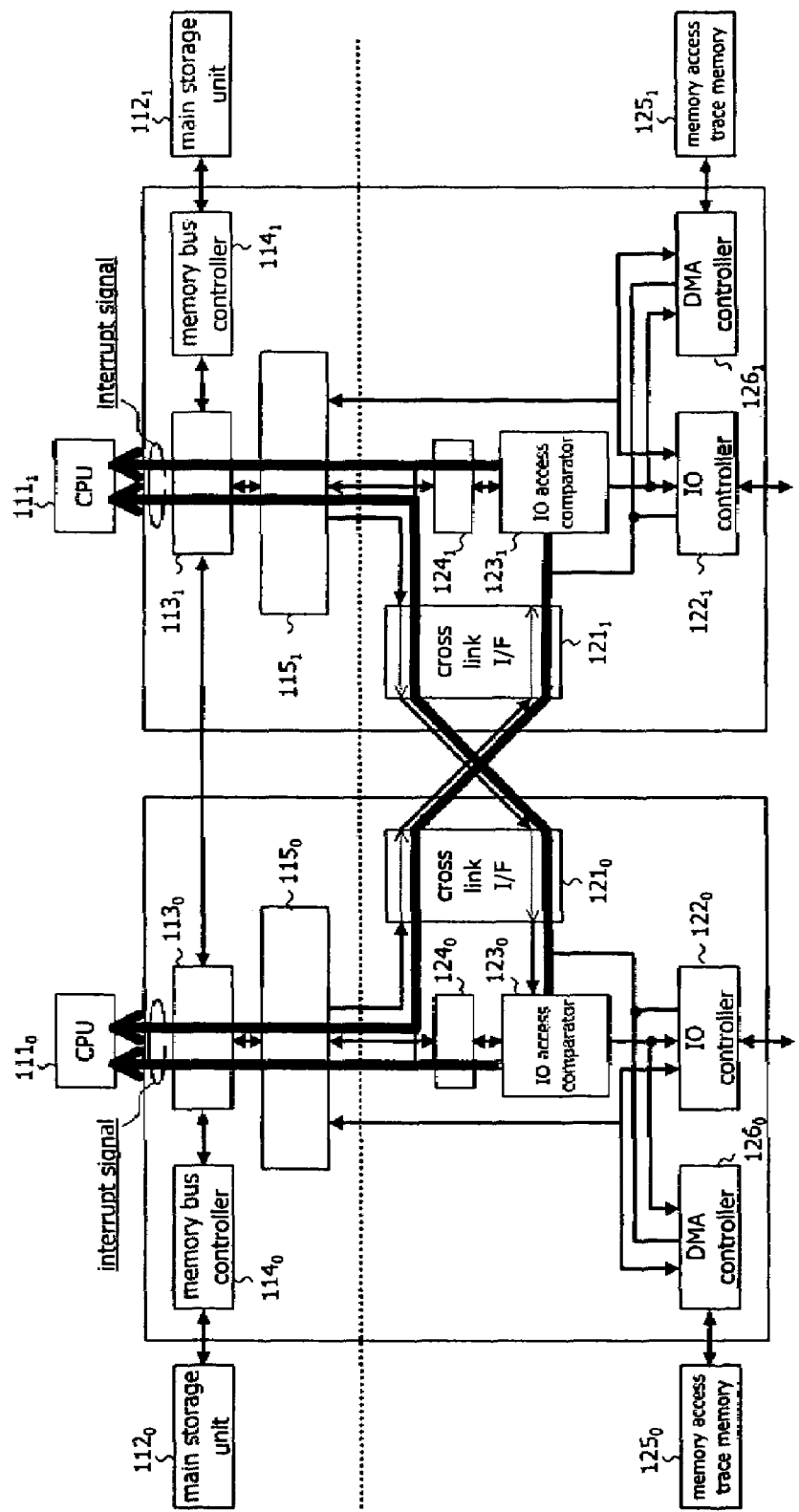
FIG. 6 is a block diagram illustrative of processing details of steps 205, 206 of the flowchart shown in FIG. 2.

In step $205$, it is assumed that IO access comparator $123_0$ detects when details of an access from CPU $111_0$ of its own system and details of an access from CPU $111_1$ of the other system are not in conformity with each other, or when the storage capacity of buffer $124_0$ that has been used to store data exceeds a predetermined value, and also that IO access comparator $123_1$ detects when details of an access from CPU $111_1$ of its own system and details of an access from CPU $111_0$ of the other system are not in conformity with each other, or when the storage capacity of buffer $124_1$ that has been used to store data exceeds a predetermined value. In step 206, IO access comparator $123_0$ sends a signal indicative of the access nonconformity or indicating that the storage capacity of buffer $124_0$ exceeds the predetermined value to CPU $111_0$ of its own system and CPU $111_1$ of the other system by way of an interrupt, and IO access comparator $123_1$ sends a signal indicative of the access nonconformity or indicating that the storage capacity of buffer $124_1$ exceeds the predetermined value to CPU $111_1$ of its own system and CPU $111_0$ of the other system by way of an interrupt, as shown in FIG. 6.

The period of time after step 202 is consumed to continuously operate CPUs $111_0$, $111_1$ to determine whether the asynchronous operation is caused by a CPU failure or not based on a software and hardware diagnostic process. However, as described above, if a long period of time is consumed to identify the cause of the asynchronous operation, then the nonconformity of the data stored in main storage units $112_0$, $112_1$ grows, making it difficult to shorten the resynchronizing process that is to be performed subsequently.

According to the present embodiment, after step 202, if an interrupt signal is sent to CPUs $111_0$, $111_1$ in step 206, then it is judged that data to be stored in main storage units $112_0$, $112_1$ after the interrupt signal cannot be transferred by DMA controllers $126_0$, $126_1$ according to the DMA transfer process. Stated otherwise, it is judged that only the data stored in main storage units $112_0$, $112_1$ during the period of time up to the interrupt signal sent in step 206 can be transferred according to the DMA transfer process, and the cause of the asynchronous operation is identified only during that period of time, after which the resynchronizing process is performed. Consequently, the period of time required to identify the cause of the asynchronous operation is limited to a minimum period of time required to perform the DMA transfer process. As a result, the period of time required to identify the cause of the asynchronous operation is secured, and the nonconformity of the data stored in main storage units $112_0$, $112_1$, which is caused by securing the period of time required to identify the cause of the asynchronous operation, is held to a minimum.

In the illustrated embodiment, DMA controllers $126_0$, $126_1$ or IO access comparators $123_0$, $123_1$ send interrupt signals to CPUs $111_0$, $111_1$ in step 206. However, even if software sends interrupt signals to CPUs $111_0$, $111_1$ in step 206 or prior to step 206, subsequent operation remains the same as described above.

Upon the occurrence of an interrupt event in step 206, the resynchronizing process begins. According to the resynchronizing process, in step 207, it is determined whether the asynchronous operation is caused by a CPU failure or not based on a software and hardware diagnostic process.

If it is judged that the asynchronous operation is not caused by a failure of either one of CPUs $111_0$, $111_1$, then it is judged that the asynchronous operation is caused by a minor failure such as a software error or the like. In step 208, DMA controllers $126_0$, $126_1$ start performing the DMA transfer process according to a software instruction.

Figure 7:
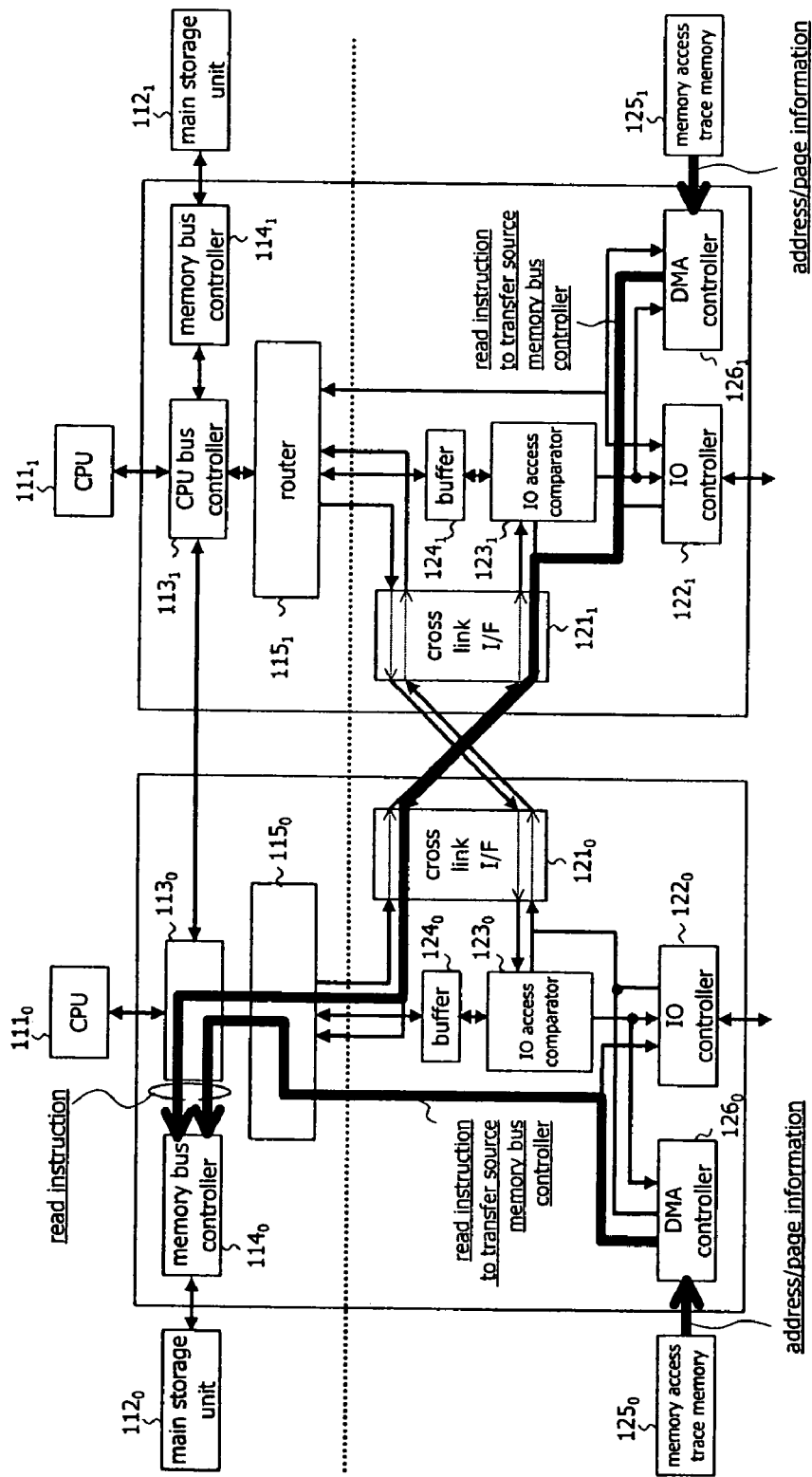
FIG. 7 is a block diagram illustrative of processing details of step 208 of the flowchart shown in FIG. 2.
Figure 8:
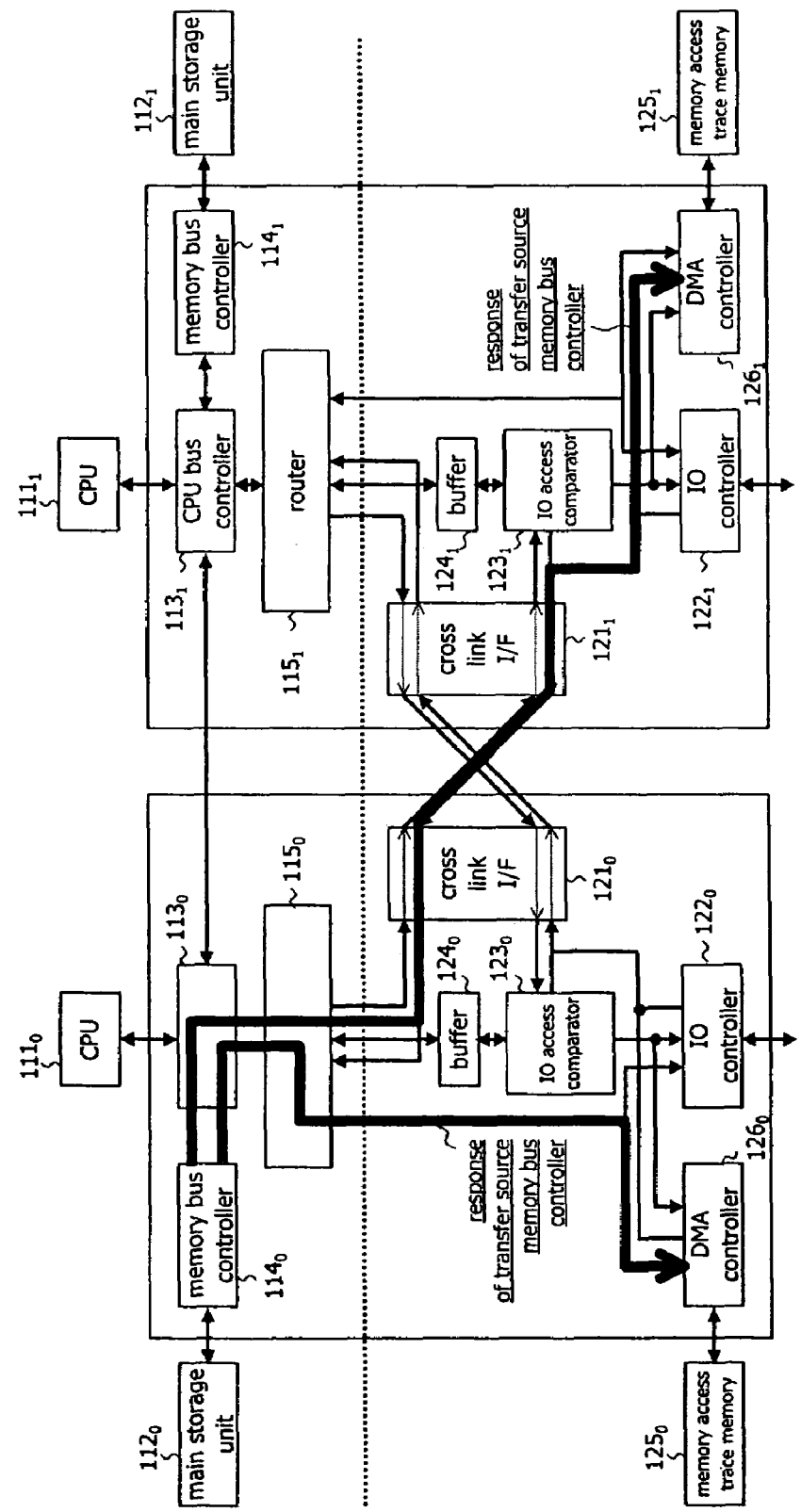
FIG. 8 is a block diagram illustrative of processing details of step 208 of the flowchart shown in FIG. 2.

Specifically, DMA controller $126_0$ reads address/page information from memory access trace memory $125_0$, and sends a read instruction for reading data from the corresponding address/page of main storage unit $112_0$ through CPU bus controller $113_0$ to memory bus controller $114_0$. Similarly, DMA controller $126_1$ reads address/page information from memory access trace memory $125_1$, and sends a read instruction for reading data from the corresponding address/page of main storage unit $112_0$ through CPU bus controller $113_0$ to memory bus controller $114_0$. The reading of the address/page information and the sending of the read instruction are illustrated in FIG. 7. Then, memory bus controller $114_0$ reads data from the corresponding address/page of main storage unit $112_0$, and transfers the read data to DMA controllers $126_0$, $126_1$, as shown in FIG. 8. Then, DMA controller $126_0$ sends a write instruction for writing the data transferred from main storage unit $112_0$ through CPU bus controller $113_1$ to memory bus controller $114_1$. Similarly, DMA controller $126_1$ sends a write instruction for writing the data transferred from main storage unit $112_0$ through CPU bus controller $113_1$ to memory bus controller $114_1$. The sending of the write instructions is illustrated in FIG. 9. Thereafter, memory bus controller $114_1$ writes the data into main storage unit $112_1$, whereupon the data stored in main storage units $112_0$, $112_1$ are in conformity with each other.

Even when all the corresponding data in main storage unit $112_0$ is transferred to main storage unit $112_1$, DMA controllers $126_0$, $126_1$ do not stop operating. Each time data is subsequently written into main storage unit $112_0$, DMA controllers $126_0$, $126_1$ perform a process of transferring data in the corresponding address/page of main storage unit $112_0$ to main storage unit $112_1$.

If the DMA transfer phase of the resynchronizing process is finished in step 209, then control goes to a next phase of the resynchronizing process in step 210.

If it is judged in step 207 that the asynchronous operation is caused by a failure of either one of CPUs $111_0$, $111_1$; then the system belonging to the failing CPU is logically disconnected by a software instruction in step 211. Thereafter, control goes to a next phase of the resynchronizing process in step 212.

According to the present embodiment, even if an asynchronous operation is detected while CPU subsystem $11_0$, $11_1$ are operating in synchronism with each other, CPUs $111_0$, $111_1$ are continuously operated without shutdown. Until a certain time is reached after the asynchronous operation is detected, CPUs $111_0$, $111_1$ are caused to wait without having DMA controllers $126_0$, $126_1$ start transferring data according to the DMA transfer process.

As a result, when an asynchronous operation is detected, it is possible to secure a period of time required to identify the cause of the asynchronous operation on a software or hardware basis before the resynchronizing process is started.

The certain time referred to above is a time when DMA controllers $126_0$, $126_1$ or IO access comparators $123_0$, $123_1$ send interrupt signals to CPUs $111_0$, $111_1$. The interrupt signals may substitute for signals for indicating to CPUs $111_0$, $111_1$ that the data stored in main storage units $112_0$, $112_1$ after the time when the interrupt signals are sent cannot be transferred by DMA controllers $126_0$, $126_1$ according to the DMA transfer process.

As the period of time required to identify the cause of an asynchronous operation may be limited to a minimum period of time required to perform the DMA transfer process, the period of time required to identify the cause of the asynchronous operation can be secured, and the nonconformity of the data stored in main storage units $112_0$, $112_1$, which is caused by securing the period of time required to identify the cause of the asynchronous operation, may be held to a minimum, thereby shortening the resynchronizing process.

According to the present embodiment CPU bus controllers $113_0$, $113_1$ send and receive CPU bus operational information to -directly compare CPU bus operations for detecting an asynchronous operation early.

Therefore, it is possible to detect an asynchronous operation early before the nonconformity of the data stored in the main storage units grows, thereby also shortening the resynchronizing process.

While preferred embodiments of the present invention have been described using specific terms, such description is for illustrative purposes only, and it is to be understood that changes and variations may be made without departing from the spirit or scope of the following claims.

What is claimed is:

1. A fault-tolerant computer comprising:
a pair of duplex systems having respective CPU subsystems operable identically in lock-step synchronism;
each of said duplex system comprising:
   a CPU of the duplex system included in one of said CPU subsystems;
   a main storage unit included in said one of the CPU subsystems;
   a CPU bus controller for continuously operating the CPU of the duplex system without shutdown if an asynchronous operation is detected while said CPU subsystems are operating in synchronism with each other;
   a trace memory for storing information of a writing area for storing data in the main storage unit of the duplex system each time data is stored in the main storage unit of the duplex system after the asynchronous operation is detected by said CPU bus controller;
   a DMA controller for, if the asynchronous operation is detected by said CPU bus controller, holding a DMA transfer process to transfer the data having the writing area stored in said trace memory, the data being stored in the main storage unit of the duplex system or the other duplex system, the DMA transfer process to transfer the data to the main storage unit of the other duplex system or the duplex system, after the asynchronous operation is detected until a predetermined time is reached;
   a buffer for temporarily storing input data and thereafter outputting the input data; and
   an access comparator for sending an interrupt signal to said CPU of the duplex system if details of an access from the CPU of the duplex system through said buffer and details of an access from the CPU of the other duplex system are compared with each other and detected as being not in conformity with each other and also if the storage capacity of said buffer exceeds a predetermined value;
wherein said predetermined time to be reached in said DMA controller is a time when the interrupt signal is sent from said access comparator to said CPU of the duplex system.

2. A fault-tolerant computer according to claim 1, wherein said CPU bus controller detects the asynchronous operation by monitoring an operating state of a CPU bus of the duplex system, sending CPU bus operational information representative of the monitored operating state to the CPU bus controller of the other duplex system, and comparing the CPU bus operational information of the duplex system and the CPU bus operational information of the other duplex system with each other.

3. A fault-tolerant computer comprising:
a pair of duplex systems having respective CPU subsystems operable identically in lock-step synchronism;
each of said duplex systems comprising:
   a CPU of the duplex system included in one of said CPU subsystems;
   a main storage unit included in said one of the CPU subsystems;
   a CPU bus controller for continuously operating the CPU of the duplex system without shutdown if an asynchronous operation is detected while said CPU subsystems are operating in synchronism with each other;
   a trace memory for storing information of a writing area for storm data in the main storage unit of the duplex system each time data is stored in the main storage unit of the duplex system after the asynchronous operation is detected by said CPU bus controller; and
   a DMA controller for, if the asynchronous operation is detected by said CPU bus controller, holding a DMA transfer process to transfer the data having the writing area stored in said trace memory, the data hem stored in the main storage unit of the duplex system or the other duplex system, the DMA transfer process to transfer the data to the main storage unit of the other duplex system or the duplex system, after the asynchronous operation is detected until a predetermined time is reached, wherein said DMA controller sends an interrupt signal to said CPU of the duplex system if the storage capacity of said trace memory exceeds a predetermined value, and said predetermined time to be reached in said DMA controller is a time when the interrupt signal is sent from said DMA controller to said CPU of the duplex system.

4. A fault-tolerant computer according to claim 3, wherein said CPU bus controller detects the asynchronous operation by monitoring an operating state of a CPU bus of the duplex system, sending CPU bus operational information representative of the monitored operating state to the CPU bus controller of the other duplex system, and comparing the CPU bus operational information of the duplex system and the CPU bus operational information of the other duplex system with each other.

5. A method of controlling a fault-tolerant computer having a pair of duplex systems having respective CPU subsystems each duplex system including a CPU of the duplex system and a main storage unit, said CPU subsystems being operable identically in lock-step synchronism, said method comprising the steps of:
a) in each of said duplex systems, continuously operating the CPU of the duplex system without shutdown if an asynchronous operation is detected while said CPU subsystems are operating in synchronism with each other;
b) in each of said duplex system, storing, in a trace memory, information of a writing area for data in the main storage unit of the duplex system each time data is stored in the main storage unit of the duplex system after the asynchronous operation is detected;
c) in each of said duplex systems, if the asynchronous operation is detected, holding a DMA transfer process to transfer the data having the writing area stored in said trace memory, the data being stored in the main storage unit of the duplex system or the other duplex system, the DMA transfer process to transfer the data to the main storage unit of the other duplex system or the duplex system, after the asynchronous operation is detected until a predetermined time is reached; and d) in each of said duplex systems, sending an interrupt signal to said CPU of the duplex system if details of an access from the CPU of the duplex system through a buffer and details of an access from the CPU of the other duplex system are compared with each other and detected as being not in conformity with each other and also if the storage capacity of said buffer exceeds a predetermined value;

wherein, in said step c), said predetermined time is a time when the interrupt signal is sent to said CPU of the duplex system.

6. A method according to claim 5, wherein said step a) comprises the steps of, in each of said duplex systems, monitoring an operating state of a CPU bus of the duplex system, sending CPU bus operational information representative of the monitored operating state to the other duplex system, and comparing the CPU bus operational information of the duplex system and the CPU bus operational information of the other duplex system with each other.

7. A method of controlling a fault-tolerant computer having a pair of duplex systems having respective CPU subsystems each duplex system including a CPU of the duplex system and a main storage unit, said CPU subsystems being operable identically in lock-step synchronism, said method comprising the steps of:

a) in each of said duplex systems, continuously operating the CPU of the duplex system without shutdown if an asynchronous operation is detected while said CPU subsystems are operating in synchronism with each other;

b) in each of said duplex systems, storing, in a trace memory, information of a writing area for storm data in the main storage unit of the duplex system each time data is stored in the main storage unit of the duplex system after the asynchronous operation is detected;

c) in each of said duplex systems, if the asynchronous operation is detected, holding a DMA transfer process to transfer the data having the writing area stored in said trace memory, the data being stored in the main storage unit of the duplex system or the other duplex system, the DMA transfer process to transfer the data to the main storage unit of the other duplex system or the duplex system, after the asynchronous operation is detected until a predetermined time is reached; and d) in each of said duplex systems, sending an interrupt signal to said CPU of the duplex system if the storage capacity of said trace memory exceeds a predetermined value;

wherein, in said step c), said predetermined time is a time when the interrupt signal is sent to said CPU of the duplex system.

8. A method according to claim 7, wherein said step a) comprises the steps of, in each of said duplex systems, monitoring an operating state of a CPU bus of the duplex system, sending CPU bus operational information representative of the monitored operating state to the other duplex system, and comparing the CPU bus operational information of the duplex system and the CPU bus operational information of the other duplex system with each other.

* * * * *